(12) United States Patent
Ling et al.

(10) Patent No.: US 9,113,410 B2
(45) Date of Patent: Aug. 18, 2015

(54) METHOD AND SYSTEM FOR SERVER-SIDE HANDLING OF A LOW-POWER CLIENT IN A WIDE AREA NETWORK

(71) Applicant: MaxLinear, Inc., Carlsbad, CA (US)

(72) Inventors: Curtis Ling, Carlsbad, CA (US); Timothy Gallagher, Encinitas, CA (US); Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 14/230,070

(22) Filed: Mar. 31, 2014

(65) Prior Publication Data

US 2014/0293854 A1    Oct. 2, 2014

Related U.S. Application Data

(63) Continuation of application No. 13/553,195, filed on Jul. 19, 2012, now Pat. No. 8,687,535.

(60) Provisional application No. 61/547,663, filed on Oct. 14, 2011, provisional application No. 61/555,550, filed on Nov. 4, 2011, provisional application No. 61/569,346, filed on Dec. 12, 2011.

(51) Int. Cl.
*G08C 17/00* (2006.01)
*H04W 52/02* (2009.01)
*G06F 1/32* (2006.01)

(52) U.S. Cl.
CPC .............. *H04W 52/02* (2013.01); *G06F 1/3209* (2013.01); *G06F 1/3234* (2013.01); *G06F 1/3278* (2013.01); *Y02B 60/126* (2013.01); *Y02B 60/32* (2013.01)

(58) Field of Classification Search
CPC ..... H04W 52/02; G06F 1/3278; G06F 1/3209
USPC ......................................................... 370/311
See application file for complete search history.

(56) References Cited

U.S. PATENT DOCUMENTS

| | | |
|---|---|---|
| 7,089,580 B1 | 8/2006 | Vogel |
| 7,194,288 B2 | 3/2007 | Lee |
| 7,389,528 B1 | 6/2008 | Beser |
| 7,551,592 B2 | 6/2009 | van Kampen |
| 7,587,746 B1 | 9/2009 | Schwartzman |
| 7,603,574 B1 | 10/2009 | Gyugyi |
| 7,930,000 B2 | 4/2011 | Quigley |

(Continued)

*Primary Examiner* — Maharishi Khirodhar
(74) *Attorney, Agent, or Firm* — McAndrews, Held & Malloy, Ltd.

(57) ABSTRACT

A CMTS may receive a request that a network device be permitted to enter a power-saving mode of operation. In response, the CMTS may enter a power-saving mode of operation wherein MAC management messages, transmission opportunities for the sleeping network device, and/or contention periods on one or more channels occur at independently determinable intervals. The CMTS may then transmit a message granting the network device permission to enter the power-saving mode of operation. The CMTS may start a sleep timer upon transmitting the MAC management message and may deregister the network device if no communication is received from the network device prior to expiration of the sleep timer. The CMTs may buffer traffic destined for the network device in a buffer of the CMTS while the network device is in the power-saving mode of operation, and may wake the network device upon the amount of buffered traffic reaching a threshold.

18 Claims, 8 Drawing Sheets

(56) References Cited

U.S. PATENT DOCUMENTS

| | | |
|---|---|---|
| 2004/0181800 A1 | 9/2004 | Rakib et al. |
| 2004/0240383 A1 | 12/2004 | Davolos |
| 2004/0264396 A1 | 12/2004 | Ginzburg |
| 2005/0025145 A1 | 2/2005 | Rakib et al. |
| 2005/0048960 A1 | 3/2005 | Yamauchi |
| 2005/0049013 A1 | 3/2005 | Chang |
| 2006/0126660 A1 | 6/2006 | Denney et al. |
| 2007/0195824 A9 | 8/2007 | Chapman |
| 2008/0018427 A1 | 1/2008 | Ezra et al. |
| 2009/0034415 A1 | 2/2009 | Barr |
| 2009/0132823 A1 | 5/2009 | Grimen et al. |
| 2009/0141901 A1 | 6/2009 | You et al. |
| 2009/0144766 A1 | 6/2009 | Jung et al. |
| 2009/0325533 A1 | 12/2009 | Lele |
| 2010/0062725 A1 | 3/2010 | Ryu |
| 2010/0226297 A1 | 9/2010 | Kasslin |
| 2011/0172000 A1 | 7/2011 | Quigley et al. |

METHOD AND SYSTEM FOR SERVER-SIDE HANDLING OF A LOW-POWER CLIENT IN A WIDE AREA NETWORK

CLAIM OF PRIORITY

This patent application is a continuation of U.S. application Ser. No. 13/553,195, filed Jul. 19, 2012, now U.S. Pat. No. 8,687,535, which makes reference to, claims priority to and claims benefit from U.S. Provisional Patent Application Ser. No. 61/547,663 filed on Oct. 14, 2011, now expired; U.S. Provisional Patent Application Ser. No. 61/555,550 filed on Nov. 4, 2011, now expired; and U.S. Provisional Patent Application Ser. No. 61/569,346 filed on Dec. 12, 2011, now expired.

Each of the above applications is hereby incorporated herein by reference in its entirety.

FIELD OF THE INVENTION

Certain embodiments of the invention relate to networking. More specifically, certain embodiments of the invention relate to a method and system for server-side handling of a low-power client in a wide area network.

INCORPORATION BY REFERENCE

This patent application also makes reference to:
U.S. patent application Ser. No. 13/485,034 entitled "Method and System for Server-Side Message Handling in a Low-Power Wide Area Network," and filed on May 31, 2012;
U.S. patent application Ser. No. 13/553,328 entitled "Method and System for Client-Side Message Handling in a Low-Power Wide Area Network," and filed on the same date as this application; and
U.S. patent application Ser. No. 13/553,175 entitled "Method and System for a Low-Power Client in a Wide Area Network," and filed on the same date as this application.

Each of the above applications is hereby incorporated herein by reference in its entirety.

BACKGROUND OF THE INVENTION

Existing wide area networks consume too much power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for server-side handling of a low-power client in a wide area network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
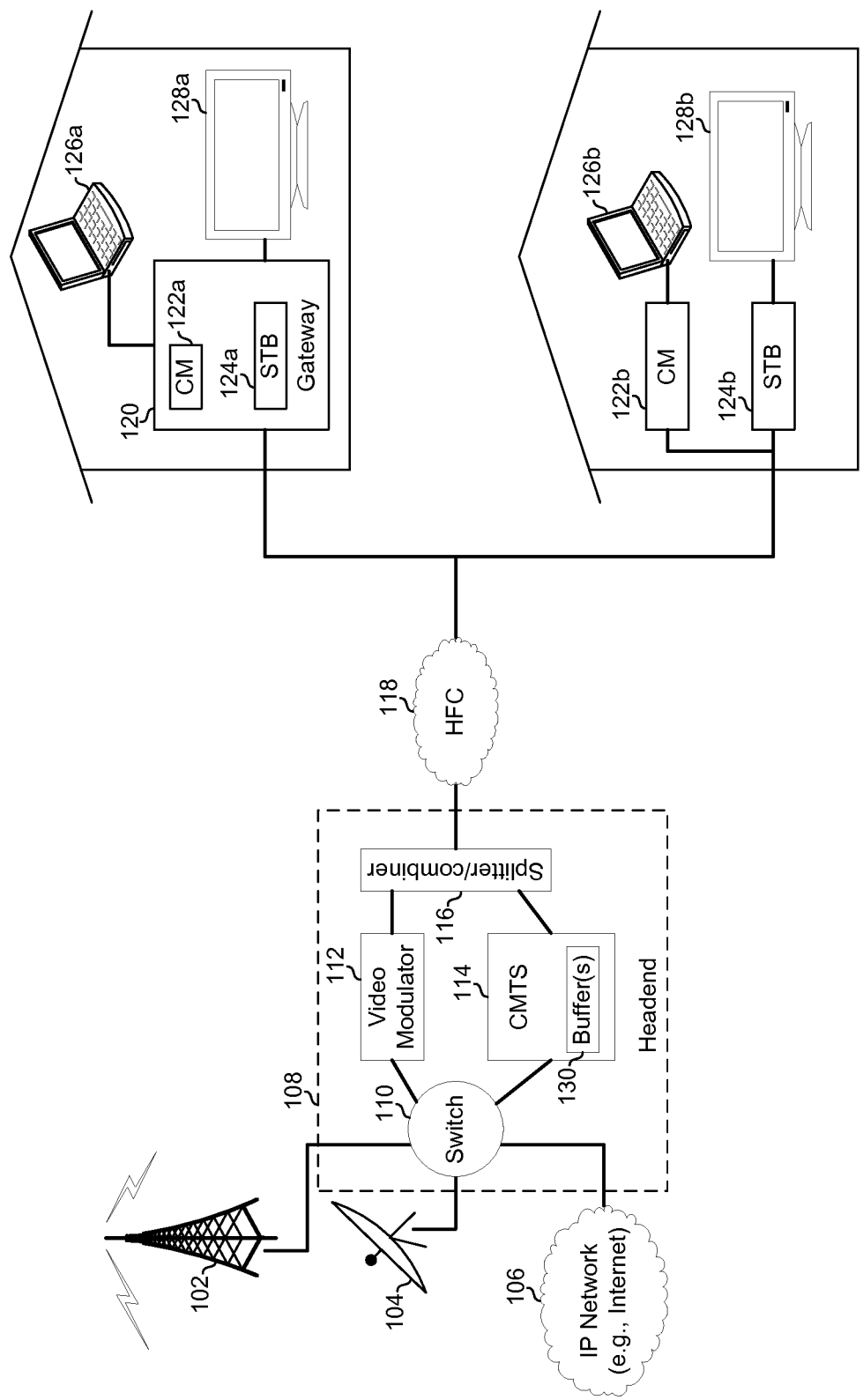
FIG. 1 depicts an exemplary DOCSIS network which may take advantage of aspects of the invention.

FIG. 1 depicts an exemplary DOCSIS network which may take advantage of aspects of the present invention. Shown in FIG. 1 is a terrestrial television antenna 102, a satellite dish 104, an Internet Protocol (IP) network 106, a headend 108, a wide area network (e.g., hybrid fiber-coaxial (HFC) network) 118, a gateway 120, end systems 126a and 126b (e.g., computers), end systems 128a and 128b (e.g., televisions), a cable modem 122b, and a set-top box 124b. The headend 108 comprises a switch 110, a video modulator 112, a cable modem termination system (CMTS) 114, and a splitter/combiner 116. The gateway 120 may be an instance of the gateway 120 described below with respect to FIG. 4, and may comprise a cable modem module 122a, and a set-top box module 124a. Each of cable modems 122a and 122b may be an instance of the cable modem module 122 described with respect to FIG. 2. Each of set-top boxes 124a and 124b may be an instance of the set-top box module 124 described with respect to FIG. 3.

For downstream traffic, the headend 108 may receive television signals via the antenna 102 and the satellite dish 104, and may receive data via the IP network 106. The switch 110 may convey the television signals to the video modulator 112 and the data to the CMTS 114. The video modulator 112 may modulate the received television signals onto a carrier. The CMTS 114 may modulate the received data onto a carrier. The splitter/combiner 116 may combine the outputs of the video modulator 112 and the CMTS 114 and output the combined signal onto the wide area network (WAN) 118 for distribution to CPE. The cable modems 122a and 122b may process the portion of the combined signal that carries the data from the CMTS 114, and the set-top box modules 124a and 124b may process the portion of the combined signal that carries the video from the video modulator 112.

For upstream data, the end systems 126a and 126b may transmit packets to the cable modem 122a and 122b, respectively, which may then modulate the packets onto a carrier for transmission via the WAN 118. The splitter/combiner 116 may then convey the data to the CMTS 114. The CMTS 114 may process the data signals (e.g., verify that they came from a registered cable modem) and convey the data to the IP network 106.

The CMTS 114 may manage connections to the cable modems 122a and 122b. This may include, for example: participating in ranging operations to control the power at which the cable modems 122a and 122b transmit; forwarding of dynamic host configuration protocol (DHCP) messages between a DHCP server and the cable modems 122a and 122b; forwarding of time of day messages between a time of day server and the cable modems 122a and 122b; and managing registration of the cable modems 122a and 122b to grant the cable modems network (e.g., Internet) access. The registration process for a cable modem 122 may comprise the cable modem 122 sending a registration request along with its configuration settings, and the CMTS 114 accepting or rejecting the cable modem based on the configuration settings. The registration process may additionally comprise an exchange of security keys, certificates, or other authentication information.

Conventionally, after a cable modem has successfully registered with the CMTS 114, the CMTS 114 will deregister the cable modem if the cable modem does not communicate with the CMTS 114 for a predetermined period of time. Accordingly, aspects of the present invention may enable a cable modem 122 and the CMTS 114 to coordinate the cable modem 122 operating in a low-power mode ("sleeping") without being deregistered by the CMTS 114. Such coordination between the cable modem 122 and the CMTS 114 may be accomplished through communication of one or more messages, as is described, for example, with respect to FIG. 7A and/or FIG. 7B.

In an exemplary embodiment of the invention, the CMTS 114 may comprise one or more buffers for storing data that is waiting to be transmitted to a CPE which is operating in a low-power mode of operation.

Aspects of the invention may enable media access planning in a downstream direction. In this regard, the CMTS 114 may communicate (e.g., via one or more special messages) with CPEs (e.g., cable modems) that it serves to coordinate when and how (e.g., on which channel(s)) the CMTS 114 will communicate with the CPEs. Downstream planning may enable a CPE to sleep until the next time at which the plan requires it to listen on the channel(s).

Aspects of the invention may enable the CMTS 114 to dedicate a timeslot for the transmission of special messages to one or more sleeping CPEs. The timeslot may occur at intervals that are independently determinable by the one or more CPEs. That is, duration of the intervals can be determined by each of the one or more CPEs without those devices having to listen for messages outside of the dedicated timeslot. In an example embodiment, such an interval may be of a predetermined duration that is made known to the one or more CPEs prior to the start of the timeslot. In another example embodiment, the duration of such an interval may be determined independently by each of the one or more CPEs while the interval is in progress. In such an embodiment, the determination may be based on context information (e.g., time of day, previous traffic, etc.) available to the one or more CPEs. Such a scheme may be analogous to an unsolicited grant service, but in the downstream direction. Accordingly, a CPE (e.g., cable modem 122, set-top box 124, or gateway 120) may sleep for one or more of the intervals between occurrences of the timeslot, wake up and listen to the channel during the timeslot, and then go back to sleep. Such dedicated timeslots in the downstream direction may coincide in time with, and/or have an independently determinable time relationship (e.g., a predetermined, fixed time relationship) to, unsolicited grants in the upstream direction. In this manner, if there is no upstream activity during the corresponding unsolicited grant, then adjustments may be made to, for example, the duration of the timeslot, the interval between occurrences of the timeslot, etc. The special messages communicated during occurrences of the timeslot may, for example, contain wake up messages. As another example, the special messages communicated during occurrences of the timeslot may comprise data communicated to and/or from "always on" end systems (e.g., appliances, utility meters, etc.) that may need to communicate over the WAN via a CPE even when the CPE is in a power-save mode.

In an embodiment of the invention, one or more logical channels may be dedicated for the communication of special messages (e.g., messages pertaining to power management) and/or for the communication of traffic to "always-on" end systems, even when a CPE via which the "always-on" end system communicates is in a power-saving mode. For example, in systems utilizing DVB-C2 or DVB-T2, such traffic can be mapped to a dedicated physical layer pipe.

Figure 2:
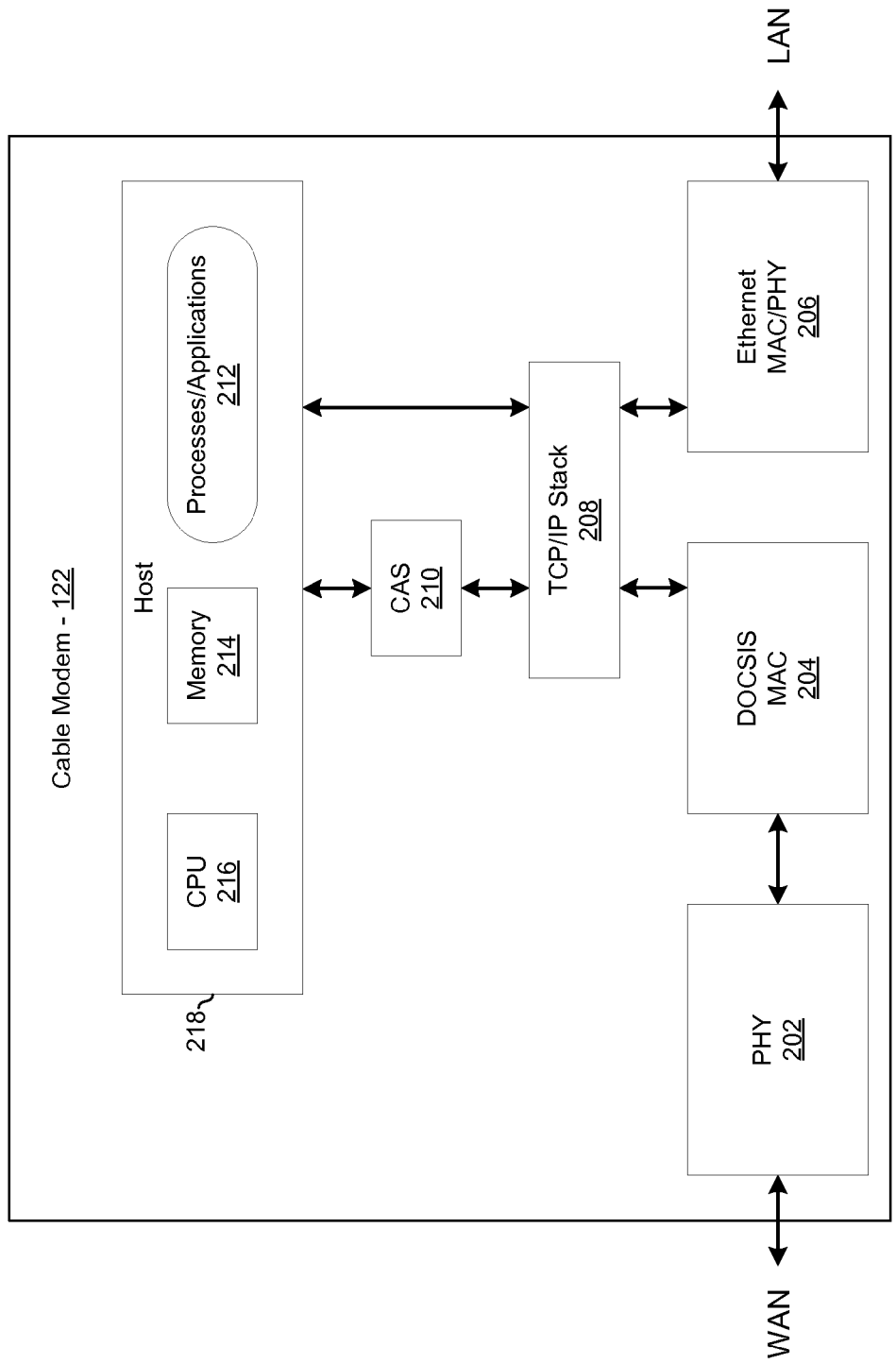
FIG. 2 depicts a cable modem as an example of customer premise equipment (CPE).

FIG. 2 depicts a cable modem as an example of customer premise equipment (CPE). The cable modem 122 comprises a physical layer transceiver (PHY) module 202, DOCSIS medium access controller (MAC) module 204, Ethernet MAC/PHY module 206, a TCP/IP stack module 208, a conditional access module 210, and a host 218 comprising a CPU 216 and memory module 214 which interoperate to execute applications/processes 212.

The PHY module 202 may be operable to receive digital signals from the MAC 204, generate corresponding analog symbols, and transmit the symbols onto the WAN 118. Similarly, the PHY module 202 may be operable to receive analog symbols over the WAN 118, convert the symbols to digital signals, and convey the digital signals to the MAC module 204. The PHY module 202 may be an instance of the PHY module 500 described below with respect to FIG. 5A. The MAC module 204 may be operable to implement DOCIS media access control protocol(s) for regulating when and/or how the cable modem 122 transmits on the WAN 118. The Ethernet MAC/PHY module 206 may be operable to implement Ethernet physical layer and data link layer protocols such that the cable modem 220 may transmit and receive via an Ethernet local area network (LAN). The TCP/IP stack module 208 may be operable to implement functionality of OSI layers 3 and higher layers to enable the host 218 to communicate via the WAN 118 and/or the LAN. The conditional access module 210 may be operable to prevent the host from transmitting and/or receiving DOCSIS traffic via the WAN 118 if the cable modem 122 is not subscribed to such services. The CPU 216 may execute instructions stored in the memory module 214 and store run-time data in the memory module 214 to execute various processes and/or applications (e.g., an operating system).

In operation, if and/or when the cable modem 122 may operate in a power-saving mode (a mode in which one or more of its components normally used for transmission and/or reception are powered down) may be controlled based on a variety of factors such as, for example, statistics and/or patterns of traffic in the network, number and/or types of devices in the premises served via the modem 122, and/or input from a network administrator and/or a user in the premises served via the modem 122. Such components may comprise a media access controller (or portions thereof) of the cable modem 122 and/or a PHY (or portions thereof) of the cable modem 122. Transitions into and/or out of a power-saving mode may be coordinated via an exchange of messages such as, for example, described below in FIGS. 7A and 7B.

Figure 3:
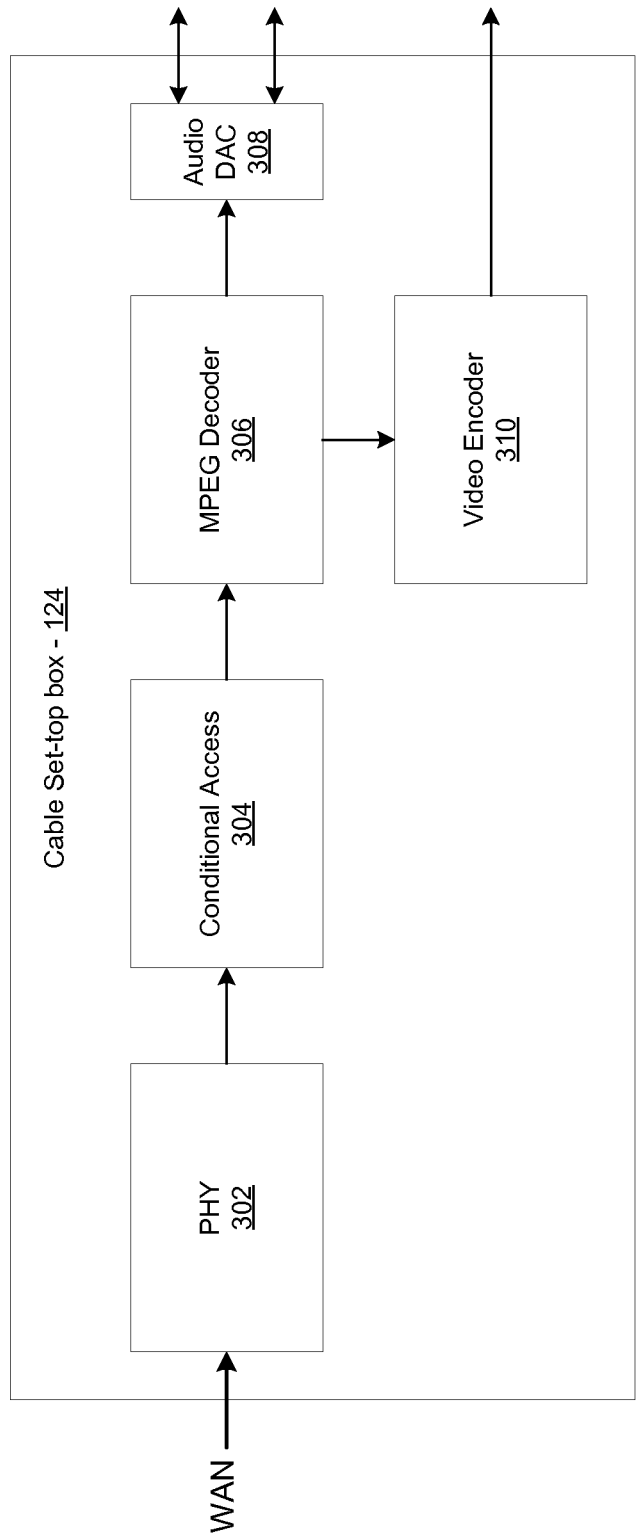
FIG. 3 depicts a cable set-top box as an example of customer premise equipment (CPE).

FIG. 3 depicts a cable set-top box as an example of customer premise equipment (CPE). The set-top box 124 comprises a physical layer transceiver (PHY) module 302, a conditional access module 304, an MPEG decoder module 306, audio digital-to-analog converter (DAC) module 308, and video encoder module 310.

The PHY module 302 may be operable to receive analog symbols over the WAN 118, convert the symbols to digital signals, and convey the digital signals to the MAC module 204. The PHY module 302 may be an instance of the PHY module 500 described below with respect to FIG. 5A. The conditional access module 304 may be operable to prevent the set-top box 124 from decoding audio/video content to which it is not subscribed. The MPEG decoder module 306 may be operable to decode MPEG streams carried in the signal received via the WAN 118. The Audio DAC module 308 may be operable to convert one or more digital audio signals output by the MPEG decoder 306 into an analog signal for output to one or more speakers. The video encoder 310 may be operable to output one or more digital video signals output by the MPEG decoder 306 according to one or more video protocols such as HDMI or DisplayPort.

In operation, if and/or when the set-top box 124 may operate in a power-saving mode (a mode in which one or more of its components normally used for transmission and/or reception are powered down) may be controlled based on a variety of factors such as, for example, statistics and/or patterns of traffic in the network, number and/or types of devices in the premises served via the set-top box 124, and/or input from a user in the premises served via the set-top box 124. Such components may comprise a media access controller (or portions thereof) of the set-top box 124 and/or a PHY (or portions thereof) of the set-top box 124. Transitions into and/or out of a power-saving mode may be coordinated via an exchange of messages such as, for example, described below in FIGS. 7A and 7B.

Figure 4:
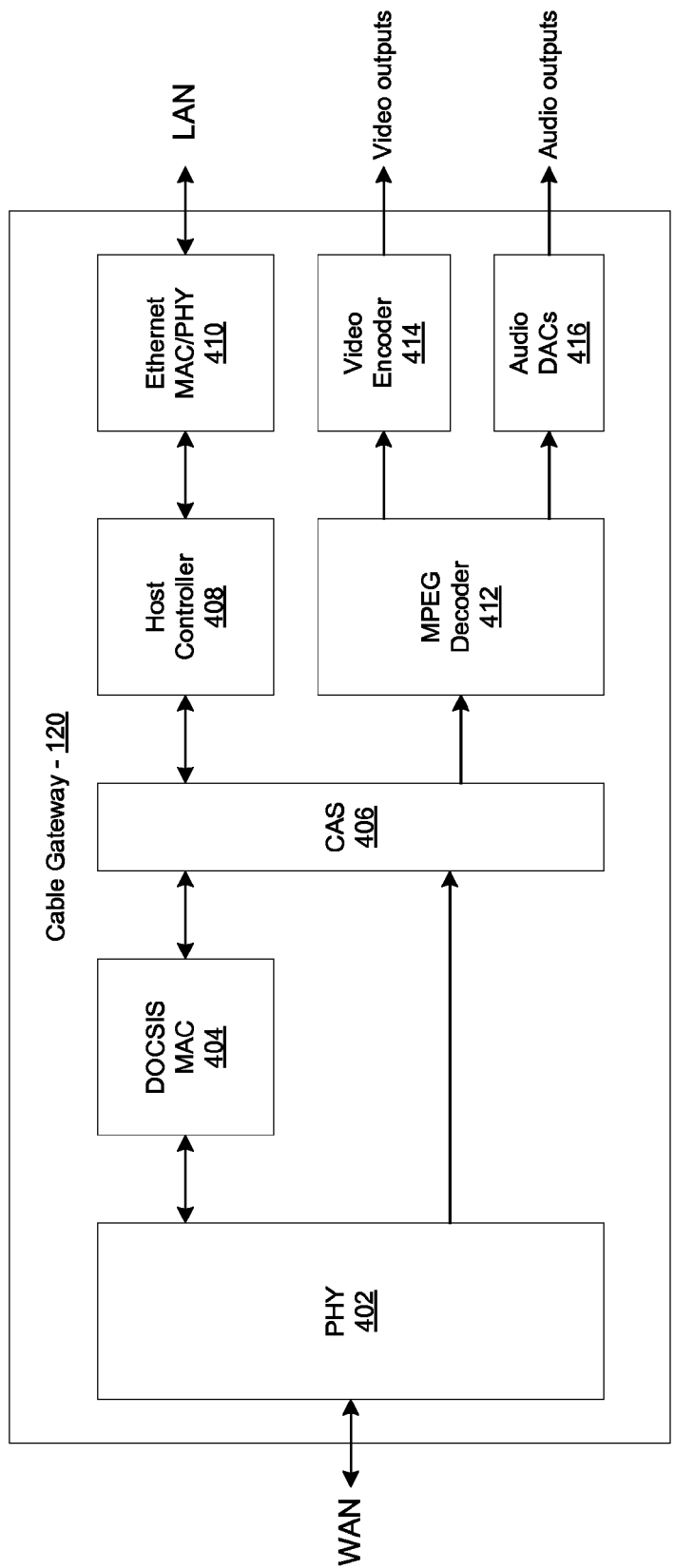
FIG. 4 depicts a cable gateway as an example of customer premise equipment (CPE).

FIG. 4 depicts a cable gateway as an example of customer premise equipment (CPE). The gateway 120 comprises a PHY module 402, a DOCSIS MAC module 404, a conditional access module 406, a host controller module 408, an Ethernet MAC/PHY module 410, an MPEG decoder module 412, a video encoder module 414, and an audio DAC module 416.

The PHY module 402 may be operable to receive digital signals from the MAC 404, generate corresponding analog symbols, and transmit the symbols onto the WAN 118. Similarly, the PHY module 402 may be operable to receive analog symbols over the WAN 118, convert the symbols to digital signals, and convey the digital signals to the MAC module 404. The PHY module 402 may be an instance of the PHY module 500 described below with respect to FIG. 5A. The MAC module 404 may be operable to implement DOCIS media access control protocol(s) for regulating when and/or how the gateway 120 transmits on the WAN 118. The conditional access module 406 may be operable to prevent the gateway 120 from decoding audio/video content and/or data to which it is not subscribed. The host controller module 408 may be operable to implement OSI layer 3 and higher OSI layers to enable communication between the WAN 118 and the LAN network via the Ethernet MAC/PHY module 410. The Ethernet MAC/PHY module 410 may be operable to implement Ethernet physical layer and data link layer protocols such that the gateway 120 may transmit and receive via an Ethernet local area network (LAN). The MPEG decoder module 412 may be operable to decode MPEG streams carried in the signal received via the WAN 118. The Audio DAC module 416 may be operable to convert one or more digital audio signals output by the MPEG decoder 412 into an analog signal for output to one or more speakers. The video encoder 414 may be operable to output one or more digital video signals output by the MPEG decoder 412 according to one or more video protocols such as HDMI or DisplayPort.

In operation, if and/or when the gateway 120 may operate in a power-saving mode (a mode in which one or more of its components normally used for transmission and/or reception are powered down) may be controlled based on a variety of factors such as, for example, statistics and/or patterns of traffic in the network, number and/or types of devices in the premises served via the gateway 120, and/or input from a user in the premises served via the gateway 120. Such components may comprise a media access controller (or portions thereof) of the gateway 120 and/or a PHY (or portions thereof) of the gateway 120. Transitions into and/or out of a power-saving mode may be coordinated via an exchange of messages such as, for example, described below in FIGS. 7A and 7B.

Figure 5A:
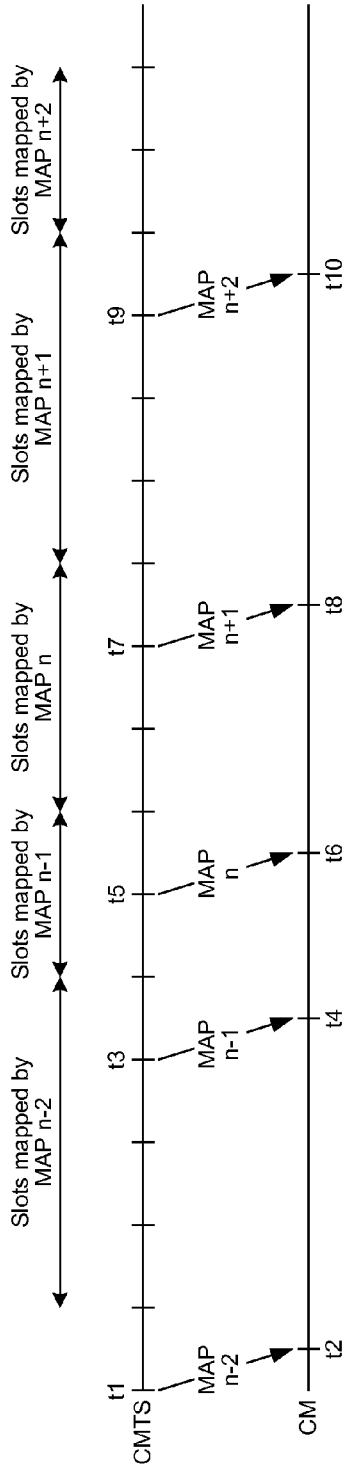
FIGS. 5A and 5B illustrate a transition to a state in which MAC management messages are transmitted at predetermined intervals.
Figure 5B:
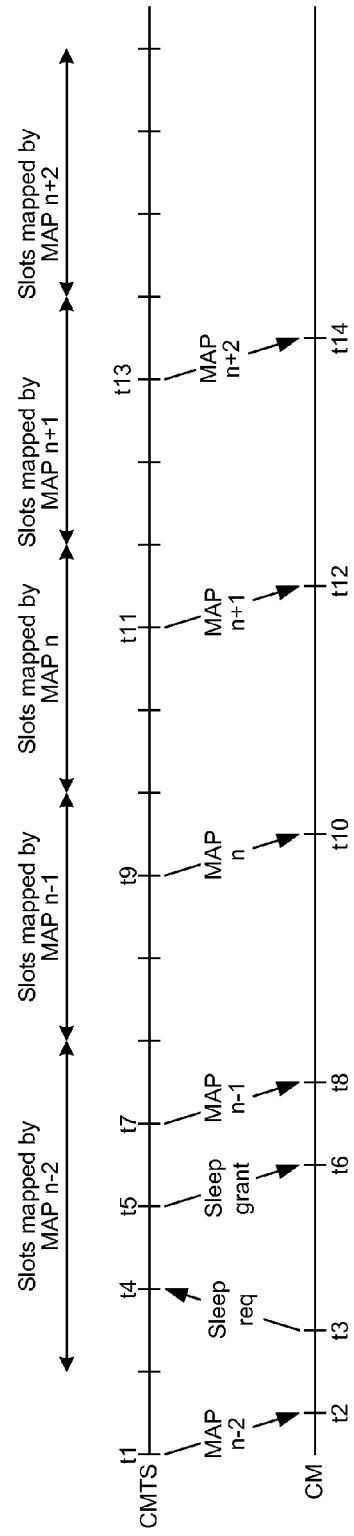

FIGS. 5A and 5B illustrate a transition to a state in which MAC management messages are transmitted at predetermined intervals. Referring to FIG. 5A and 5B, there is shown MAP messages n-6 through n communicated at non-independently-determinable intervals. That is, from the cable modem's perspective the duration of each of the intervals (t3-t1), (t5-t3), (t7-t5), and (t9-t7) are rand and, thus the cable modem has to continuously listen. At time t13, however, the cable modem sends a request that it be permitted to enter a power-saving mode of operation. The message may be, for example, a MAC management message wherein the contents of its Type Value field are uniquely associated with a sleep request.

At time t15, the CMTS responds with a message granting the cable modem permission to sleep. The message may be, for example, a MAC management message wherein the contents of its Type Value field are uniquely associated with a message granting permission to sleep. The CMTS may determine to grant the request based on various considerations such as network traffic, type(s) of devices in the network. The message granting the sleep request may also include parameters such as how long the cable modem is permitted to sleep, whether the cable modem must listen for messages while it is sleeping, the timing of MAC management messages, contention periods, and/or timeslots reserved for the cable modem while the modem is sleeping, etc.

Subsequent to the grant at time t15, the CMTS may send MAP messages at independently determinable intervals until the modem transitions out of the power-saving mode back to a normal mode of operation. That is, the duration of each of the intervals (t19-t17), (t21-t19), and (t23-t21) is either predetermined and known to the cable modem prior to the start of the interval, or determinable from context during the interval (without the cable modem having to listen during the interval). In the example embodiment depicted, each of the intervals (t19-t17), (t21-t19), and (t23-t21) are of a common, predetermined duration. While in the power-saving mode, the cable modem may track time such that it knows when the next MAP message will be sent. In this manner, should the cable modem desire, it can transition out of the power-saving state just in time to hear the MAP message, receive and process the MAP message, and then return to the power-saving state immediately thereafter.

Figure 6A:
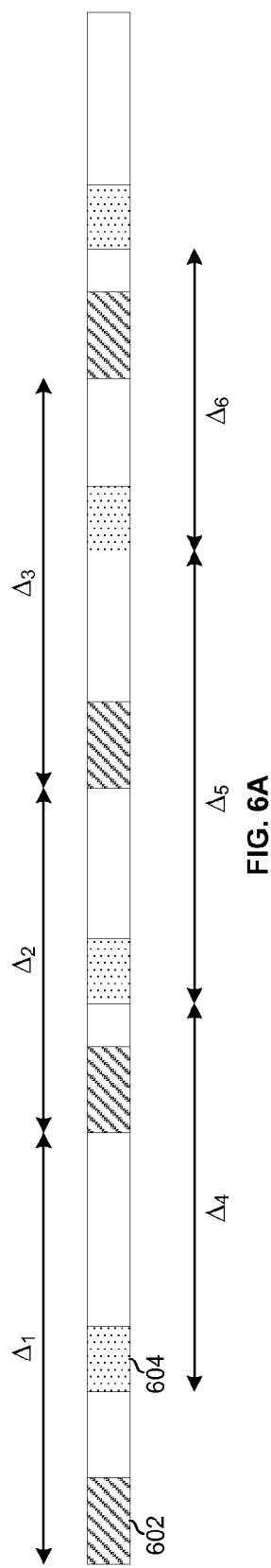
FIGS. 6A and 6B illustrate activity on a network channel before and during a CPE entering a power-saving state.
Figure 6B:
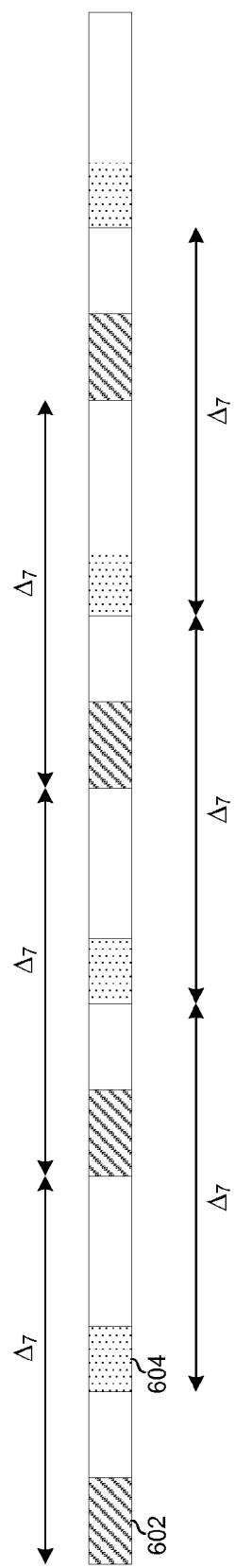

FIGS. 6A and 6B illustrate activity on a network channel before and during a CPE entering a power-saving state. Shown in these two figures is activity on an exemplary WAN channel. During timeslots 602, MAC management messages, such as UCD, SYNC, and/or MAP messages, may be transmitted by the CMTS. The timeslots 804 may correspond to, for example, contention periods and/or timeslots reserved for a particular CPE. In FIG. 6A, the timeslots 602 occur at non-independently-determinable intervals. That is, from the cable modem's perspective, the duration of each of the intervals Δ1, Δ2, and Δ3 are of varying durations. Similarly, timeslots 604 occur at non-independently-determinable intervals. That is, Δ4, Δ5, and Δ6 is random and, thus the cable modem has to continuously listen. In FIG. 6B, after the CPE has been permitted to enter a power-saving mode of operation, the timeslots 602 and 604 occur at predetermined intervals. That is, the cable modem can independently determine the duration of each of Δ8-Δ13 and power off and on its receiver accordingly.

Figure 7:
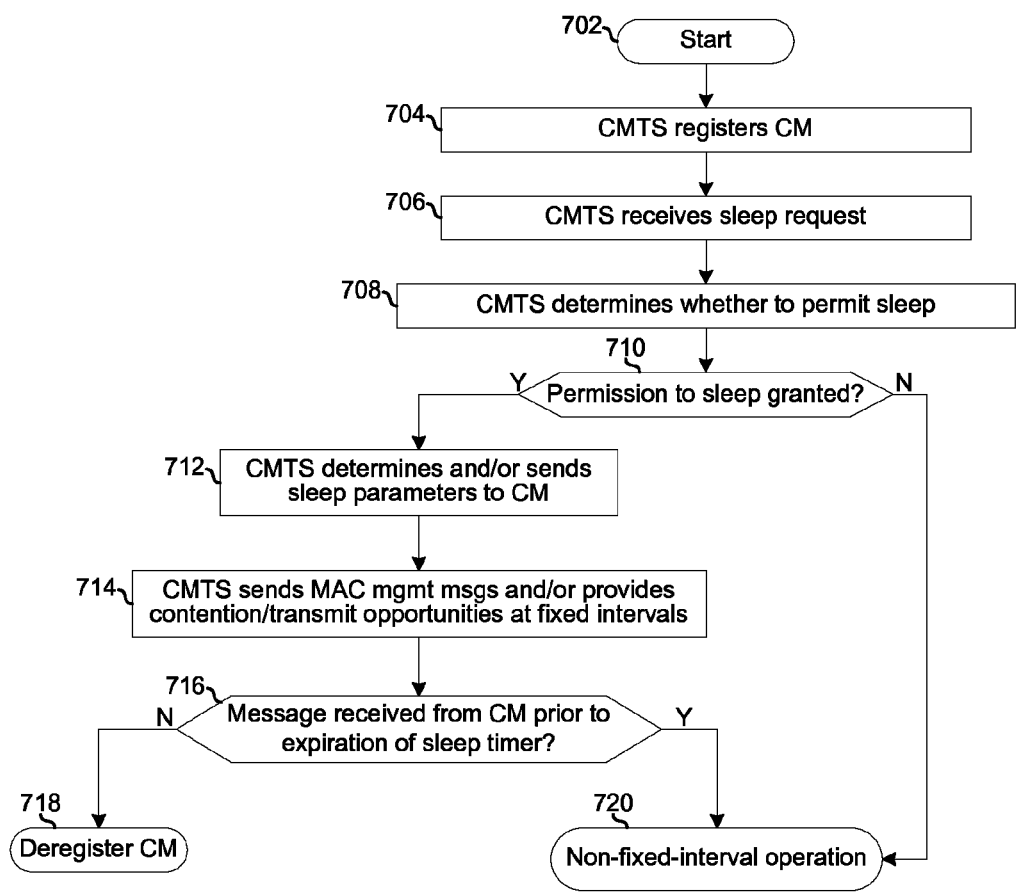
FIG. 7 is a flowchart illustrating exemplary steps implemented in a CMTS for handling a client device which supports a power-saving mode of operation.

FIG. 7 is a flowchart illustrating exemplary steps implemented in a CMTS for handling a client device which supports a power-saving mode of operation. Subsequent to start step 702, in step 704, a cable modem connects to the CMTS and the two devices exchange messages resulting in the CMTS registering the cable modem. In step 706, the CMTS receives a sleep request message from the CMTS. The message may be, for example, a MAC management message wherein the contents of its Type Value field are uniquely associated with a sleep request. In step 708, the CMTS decides whether to grant the sleep request. The CMTS may make the decision based on, for example, past network traffic patterns and/or statistics, expected future traffic, time of day, type and/or number of devices connected to the CMTS via the cable modem, a level of service to which the cable modem is subscribed, an amount of bandwidth that the cable modem has used in the billing period or has left to use in the billing period, or any other suitable considerations.

In step 710, if the CMTS denies the cable modem permission to transition to the low-power mode, then the exemplary steps advance to step 720. In step 720, the CMTS operates in a mode of operation in which timeslots 602 and/or 604 (FIGS. 6A and 6B) do not occur at independently-determinable intervals or times.

Returning to step 710, if the CMTS grants the cable modem permission to enter the low-power mode, then the exemplary steps advance to step 712. In step 712, the CMTS determines parameters associated with the cable modem's sleep cycle and sends the parameters to the cable modem. Such parameters may include, for example, how long the cable modem is permitted to sleep, the timing at which various timeslots and/or activity will occur on the channel(s) while the cable modem is sleeping, the channel(s) on which the cable modem should and/or may receive and/or transmit while in the power-saving mode, the type of signals that the cable modem may and/or should transmit and/or receive while in the power-saving mode, and/or any other suitable parameters. The grant of permission may be, for example, a MAC management message wherein the contents of its Type Value field are uniquely associated with a grant of permission to sleep.

In step 714, the CMTS may operate in a mode in which the timeslots 602 and 604 (FIGS. 6A and 6B) are sent at independently determinable (e.g., predetermined) intervals or times.

In step 716, the amount of time which the cable modem was supposed to be in the low-power mode has expired. Accordingly, the CMTS may expect some communication from the cable modem to confirm that it is still connected to the WAN and has successfully come out of the low-power mode. In an exemplary embodiment of the invention, if the CMTS does not receive any communication from the cable modem within a certain amount of time, then in step 718 the CMTS may deregister the cable modem. Conversely, if the CMTS does receive a communication from the cable modem, then in step 720 the CMTS may resume a mode of operation in which the timeslots 602 and/or 604 do not occur at independently determinable intervals or times.

Figure 8:
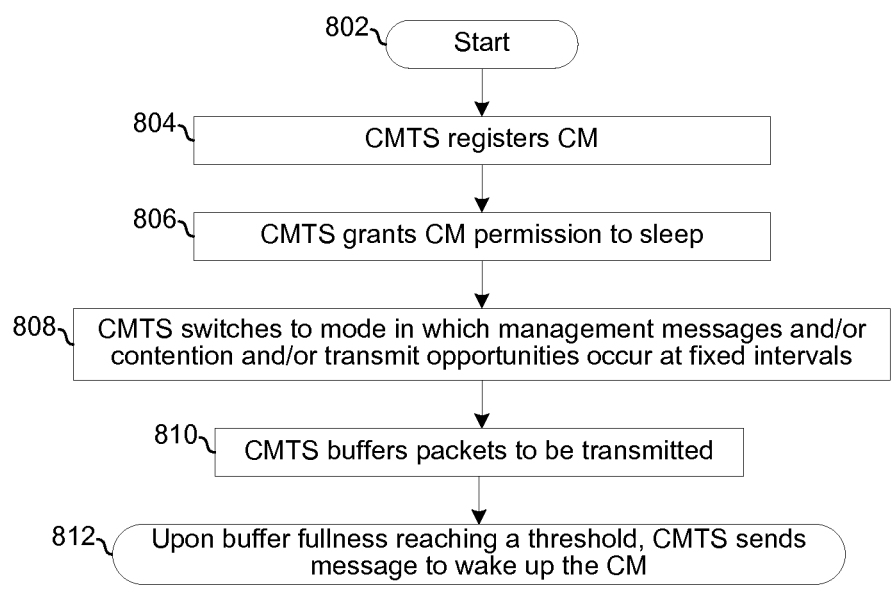
FIG. 8 is a flowchart illustrating exemplary steps implemented in a CMTS for handling a client device which supports a power-saving mode of operation.

FIG. 8 is a flowchart illustrating exemplary steps implemented in a CMTS for handling a client device which supports a power-saving mode of operation. Subsequent to start step 802, in step 804, a cable modem connects to the CMTS and the two devices exchange messages resulting in the CMTS registering the cable modem. In step 806, the CMTS grants the cable modem permission to enter a sleep mode. In step 808, the CMTS switches to a mode of operation in which management message, transmit opportunities for the sleeping cable modem, and/or contention opportunities occur at independently determinable intervals or times. In step 810, while the cable modem is in the low-power mode, the CMTS buffers traffic to be transmitted to the cable modem. In step 812, upon the amount of traffic in the buffer(s) reaching a set threshold, the CMTS may send a message to wake the cable modem from the low-power mode of operation.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for server-side handling of a low-power client in a wide area network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a cable modem termination system (CMTS) of a Data Over Cable Service Interface Specification (DOCSIS) network:
   receiving a request that a network device be permitted to enter a power-saving mode of operation;
   in response to said request, entering a power-saving mode of operation which comprises transmitting a message granting said network device permission to enter said power-saving mode of operation, wherein said message granting said network device permission to enter said power-saving mode of operation is a Moving Picture Experts Group (MPEG) transport stream packet having a first program identifier (PID) that:
   is uniquely associated with messages that manage power consumption in the DOCSIS network; and
   is different from a second PID used for MPEG transport stream packets that carry DOCSIS messages.

2. The method of claim 1, wherein said network device is a cable modem, cable set-top-box, or cable gateway.

3. The method of claim 1, comprising:
   while operating in said power-saving mode of operation, starting a sleep timer upon transmitting a media access control (MAC) management message.

4. The method of claim 3, wherein said MAC management message comprises a MAP and/or upstream channel descriptor (UCD) message.

5. The method of claim 3, comprising deregistering said network device if no communication is received from said network device prior to expiration of said sleep timer.

6. The method of claim 3, comprising determining a value at which said sleep timer expires based on network traffic statistics.

7. The method of claim 1, wherein:
   said request is a media access control (MAC) management message; and
   contents of a type value field of said request are uniquely associated with requests for permission to enter a power-saving mode of operation.

8. A method comprising:
   in a host device that centrally manages access of a plurality of Data Over Cable Service Interface Specification (DOCSIS) client devices to a shared medium comprising one or more coaxial cables and/or fiber optic cables:
   receiving, from one of said client devices via said one or more coaxial cables and/or fiber optic cables, a request that said one of said client devices be permitted to enter a power-saving mode of operation;
   in response to said request, entering a power-saving mode of operation which comprises transmitting a message granting said one of said client devices permission to enter said power-saving mode of operation, wherein said message granting said one of said client devices permission to enter said power-saving mode of operation is a Moving Picture Experts Group (MPEG) transport stream packet having a first program identifier (PID) that:
   is uniquely associated with messages that manage power consumption in the DOCSIS network; and
   is different from a second PID used for MPEG transport stream packets that carry DOCSIS message.

9. The method of claim 8, comprising:
   buffering traffic destined for said one of said client devices in a buffer of said host device while said one of said client devices is in said power-saving mode of operation; and
   upon an amount of traffic stored in said buffer reaching a threshold, transmitting a message to trigger said network device to transition out of said power-saving mode of operation.

10. A system comprising:
    circuitry for use in a cable modem termination system (CMTS) of a Data Over Cable Service Interface Specification (DOCSIS) network, wherein said circuitry comprises at least one networking circuit for use in transmitting and/or receiving of signals and at least one control circuit for performing control operations based on transmitted and/or received signals, said circuitry being operable to:
    receive, via said at least one networking circuit, a request that a network device be permitted to enter a power-saving mode of operation;
    in response to said at least one control circuit processing said request, enter a power-saving mode of operation in which a message granting said network device permission to enter said power-saving mode of operation is transmitted, wherein said message granting said network device permission to enter said power-saving mode is a Moving Picture Experts Group (MPEG) transport stream packet having a first program identifier (PID) that:
    is uniquely associated with messages that manage power consumption in the DOCSIS network; and
    is different from a second PID used for MPEG transport stream packets that carry DOCSIS messages.

11. The system of claim 10, wherein said network device is a cable modem, cable set-top-box, or cable gateway.

12. The system of claim 10, wherein, while in said power-saving mode of operation, said circuitry is operable to start a sleep timer upon transmitting a media access control (MAC) management message.

13. The system of claim 12, wherein said MAC management message comprises a MAP and/or upstream channel descriptor (UCD) message.

14. The system of claim 12, wherein said circuitry is operable to deregister said network device if no communication is received from said network device prior to expiration of said sleep timer.

15. The system of claim 12, wherein said circuitry is operable to determine a value at which said sleep timer expires based on network traffic statistics.

16. The system of claim 10, wherein:
    said request is a media access control (MAC) management message; and
    contents of a type value field of said request are uniquely associated with requests for permission to enter a power-saving mode of operation.

17. The system of claim 10, comprising buffering traffic destined for said network device in a buffer of said CMTS while said network device is in said power-saving mode of operation.

18. The system of claim 17, wherein said circuitry is operable to, upon an amount of traffic stored in said buffer reaching a threshold, transmitting a message to trigger said network device to transition out of said power-saving mode of operation.

* * * * *